United States Patent
Whelan (10) Patent No.: US 10,243,766 B2
(45) Date of Patent: Mar. 26, 2019

(54) SYSTEMS AND METHODS FOR DETERMINING AND COMPENSATING FOR OFFSETS IN RF COMMUNICATIONS

(71) Applicant: LoJack Corporation, Canton, MA (US)

(72) Inventor: Yvonne Whelan, Canton, MA (US)

(73) Assignee: LoJack Corporation, Canton, MA (US)

(*) Notice: Subject to any disclaimer, the term of this patent is extended or adjusted under 35 U.S.C. 154(b) by 0 days.

(21) Appl. No.: 15/683,000

(22) Filed: Aug. 22, 2017

(65) Prior Publication Data

US 2019/0013976 A1 Jan. 10, 2019

Related U.S. Application Data (60) Provisional application No. 62/528,902, filed on Jul. 5, 2017.

(51) Int. Cl.
  *H04L 27/00* (2006.01)
  *H04L 27/20* (2006.01)
  *H04L 27/26* (2006.01)

(52) U.S. Cl.
  CPC ...... *H04L 27/0014* (2013.01); *H04L 27/2082* (2013.01); *H04L 27/2014* (2013.01); *H04L 27/2659* (2013.01); *H04L 2027/0026* (2013.01)

(58) Field of Classification Search
  CPC .................. H04L 27/0014; H04L 27/2082
  See application file for complete search history.

(56) References Cited

U.S. PATENT DOCUMENTS

| | | | |
|---|---|---|---|
| 4,177,466 | A | 12/1979 | Reagan |
| 4,818,988 | A | 4/1989 | Cooperman et al. |
| 4,818,998 | A | 4/1989 | Apsell et al. |
| 4,908,609 | A | 3/1990 | Stroomer |

(Continued)

FOREIGN PATENT DOCUMENTS

| | | |
|---|---|---|
| EP | 1885058 A1 | 2/2008 |
| WO | 1991012671 | 8/1991 |
| WO | 2011049619 A1 | 4/2011 |

OTHER PUBLICATIONS

Written Opinion of the International Searching Authority for PCT Application No. PCT/US10/02789 dated Dec. 29, 2010 (6 pages).

*Primary Examiner* — Kabir A Timory
(74) *Attorney, Agent, or Firm* — KPPB LLP (57) ABSTRACT

Systems and methods for identifying and compensating for offsets in received transmission signals in accordance with embodiments of the invention are disclosed. In one embodiment, a vehicle telematics device includes a processor, a transceiver connected to the processor, and a memory connected to the processor and storing a signal detection application, wherein the signal detection application directs the processor to command the transceiver to acquire a transmitted signal based on a set of listening parameters, store the transmitted signal as received signal data, determine the presence of a signal offset by determining monotonicity in the received signal data, generate offset data based on the determined monotonicity, command the transceiver to adjust at least one listening parameter based on the offset data, demodulate the received signal data based on the adjusted listening parameters, and issue a low power command signal.

20 Claims, 7 Drawing Sheets

(56) References Cited

U.S. PATENT DOCUMENTS

| | | |
|---|---|---|
| 5,032,845 A | 7/1991 | Velasco |
| 5,109,538 A | 4/1992 | Ikonen et al. |
| 5,343,498 A | 8/1994 | Toy et al. |
| 5,392,287 A | 2/1995 | Tiedemann, Jr. et al. |
| 5,438,684 A | 8/1995 | Osamni et al. |
| 5,465,392 A | 11/1995 | Baptist et al. |
| 5,526,357 A | 6/1996 | Jandress |
| 5,704,008 A | 12/1997 | Duvall, Jr. |
| 5,732,339 A | 3/1998 | Auvray et al. |
| 5,789,098 A | 8/1998 | Pinder |
| 5,917,423 A | 6/1999 | Duvall |
| 5,939,941 A | 8/1999 | Nair et al. |
| 5,940,431 A | 8/1999 | Haartsen et al. |
| 6,058,289 A | 5/2000 | Gardner et al. |
| 6,198,919 B1 | 3/2001 | Buytaert et al. |
| 6,229,988 B1 | 5/2001 | Stapefeld et al. |
| 6,289,227 B1 | 9/2001 | Shi |
| 6,317,049 B1 | 11/2001 | Toubia et al. |
| 6,363,102 B1 | 3/2002 | Ling et al. |
| 6,522,698 B1 | 2/2003 | Irving et al. |
| 6,535,116 B1 | 3/2003 | Zhou |
| 6,564,074 B2 | 5/2003 | Romans |
| 6,603,335 B1 | 8/2003 | Macphail et al. |
| 6,647,270 B1 | 11/2003 | Himmelstein |
| 6,665,613 B2 | 12/2003 | Duvall |
| 6,774,845 B2 | 8/2004 | De |
| 6,799,030 B2 | 9/2004 | Barber |
| 6,888,495 B2 | 5/2005 | Flick |
| 6,978,149 B1 | 12/2005 | Morelli et al. |
| 7,030,731 B2 | 4/2006 | Lastinger |
| 7,034,656 B2 | 4/2006 | Buchner |
| 7,149,484 B2 | 12/2006 | Nation |
| 7,149,623 B2 | 12/2006 | Flick et al. |
| 7,269,145 B2 | 9/2007 | Koo |
| 7,378,964 B1 | 5/2008 | Amir et al. |
| 7,511,606 B2 | 3/2009 | Romano et al. |
| 7,525,289 B2 | 4/2009 | Janik et al. |
| 7,573,381 B2 | 8/2009 | Karr et al. |
| 7,574,192 B2 | 8/2009 | Gudmundsson |
| 7,592,918 B2 | 9/2009 | Karr |
| 7,593,711 B2 | 9/2009 | Romano et al. |
| 7,598,855 B2 | 10/2009 | Scalisi et al. |
| 7,733,187 B2 | 6/2010 | Tateoka et al. |
| 7,768,234 B2 | 8/2010 | Janik et al. |
| 7,853,218 B2 | 12/2010 | Romano et al. |
| 8,013,735 B2 | 9/2011 | Arpin et al. |
| 8,036,152 B2 | 10/2011 | Hirt et al. |
| 8,099,062 B1 | 1/2012 | Terrovitis et al. |
| 8,126,036 B2 | 2/2012 | Koren et al. |
| 8,150,686 B2 | 4/2012 | Pietsch et al. |
| 8,223,783 B2 | 7/2012 | Shorty |
| 8,229,518 B2 | 7/2012 | Bourque |
| 8,489,271 B2 | 7/2013 | Hergesheimer et al. |
| 8,618,957 B2 | 12/2013 | Meacci et al. |
| 8,630,605 B2 | 1/2014 | Meacci et al. |
| 8,787,823 B2 | 7/2014 | Justice |
| 9,088,398 B2 | 7/2015 | Rhodes et al. |
| 9,112,674 B2 | 8/2015 | Meacci et al. |
| 9,480,037 B2 | 10/2016 | Meacci et al. |
| 9,565,636 B2 | 2/2017 | Meacci et al. |
| 2002/0019215 A1 | 2/2002 | Romans |
| 2003/0030568 A1 | 2/2003 | Lastinger et al. |
| 2003/0067672 A1 | 4/2003 | Bodeep et al. |
| 2003/0112124 A1 | 6/2003 | Gudmundsson |
| 2003/0117969 A1 | 6/2003 | Koo et al. |
| 2003/0154027 A1 | 8/2003 | Flick et al. |
| 2003/0218500 A1 | 11/2003 | Yamamoto et al. |
| 2004/0017859 A1 | 1/2004 | Sills et al. |
| 2004/0039504 A1 | 2/2004 | Coffee et al. |
| 2004/0075494 A1 | 4/2004 | Klomsdorf et al. |
| 2004/0104771 A1 | 6/2004 | Dauphinee et al. |
| 2004/0105033 A1 | 6/2004 | Dauphinee et al. |
| 2004/0130488 A1 | 7/2004 | Champlain |
| 2004/0201520 A1 | 10/2004 | Flick et al. |
| 2004/0207468 A1 | 10/2004 | Klomsdorf et al. |
| 2004/0207510 A1 | 10/2004 | Buchner |
| 2005/0130617 A1 | 6/2005 | Burns et al. |
| 2005/0208910 A1 | 9/2005 | Burns et al. |
| 2005/0233764 A1 | 10/2005 | Solski et al. |
| 2005/0258806 A1 | 11/2005 | Janik et al. |
| 2006/0067435 A1 | 3/2006 | Ogawa et al. |
| 2006/0194549 A1 | 8/2006 | Janik et al. |
| 2006/0255935 A1 | 11/2006 | Scalisi et al. |
| 2006/0276160 A1 | 12/2006 | Romano et al. |
| 2007/0008108 A1 | 1/2007 | Schurig et al. |
| 2007/0103271 A1 | 5/2007 | King |
| 2007/0194924 A1 | 8/2007 | Karr |
| 2007/0207750 A1 | 9/2007 | Brown et al. |
| 2007/0281626 A1 | 12/2007 | Dobosz et al. |
| 2008/0144539 A1 | 6/2008 | Sperlich et al. |
| 2008/0164940 A1 | 7/2008 | Jeon et al. |
| 2008/0180178 A1 | 7/2008 | Gao et al. |
| 2008/0240311 A1 | 10/2008 | Piirainen et al. |
| 2009/0309656 A1 | 12/2009 | Jeon et al. |
| 2010/0179897 A1 | 7/2010 | Gafford et al. |
| 2010/0240302 A1 | 9/2010 | Buczkiewicz |
| 2011/0095915 A1 | 4/2011 | Justice et al. |
| 2011/0098015 A1 | 4/2011 | Goodwin et al. |
| 2012/0120990 A1 | 5/2012 | Koren et al. |
| 2014/0010210 A1 | 1/2014 | Rhodes et al. |
| 2014/0105089 A1 | 4/2014 | Meacci et al. |
| 2014/0105341 A1 | 4/2014 | Meacci et al. |
| 2014/0119567 A1* | 5/2014 | DeLine .............. B60R 1/12 381/86 |
| 2015/0015424 A1 | 1/2015 | Justice et al. |
| 2016/0073369 A1 | 3/2016 | Meacci et al. |
| 2016/0087658 A1 | 3/2016 | Weissman et al. |
| 2016/0209818 A1 | 7/2016 | Mandle et al. |
| 2016/0214572 A1 | 7/2016 | Snider |
| 2016/0241699 A1 | 8/2016 | Milnark et al. |
| 2017/0127353 A1 | 5/2017 | Meacci et al. |
| 2018/0138878 A1 | 5/2018 | Domino et al. |
| 2019/0013783 A1 | 1/2019 | Fedan |
| 2019/0013880 A1 | 1/2019 | Whelan |

\* cited by examiner

SYSTEMS AND METHODS FOR DETERMINING AND COMPENSATING FOR OFFSETS IN RF COMMUNICATIONS

CROSS REFERENCE TO RELATED APPLICATIONS

The instant application claims priority to U.S. Provisional Patent Application No. 62/528,902, filed Jul. 5, 2017, the disclosure of which is hereby incorporated by reference in its entirety.

FIELD OF THE INVENTION

The present invention relates to signal processing and more specifically to compensating for unexpected signal properties.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, vehicle location determination, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for identifying and compensating for offsets in received transmission signals in accordance with embodiments of the invention are disclosed. In one embodiment, a vehicle telematics device includes a processor, a transceiver connected to the processor, and a memory connected to the processor and storing a signal detection application, wherein the signal detection application directs the processor to command the transceiver to acquire a transmitted signal based on a set of listening parameters, store the transmitted signal as received signal data, determine the presence of a signal offset by determining monotonicity in the received signal data, generate offset data based on the determined monotonicity, command the transceiver to adjust at least one listening parameter based on the offset data, demodulate the received signal data based on the adjusted listening parameters, and issue a low power command signal.

In an additional embodiment of the invention, the determination of a signal offset is based on a subset of the received signal data.

In another embodiment of the invention, the signal detection application further directs the processor to examine received signal data for changes in sign in the received signal data values.

In yet another additional embodiment of the invention, the transmitted signal is a modulated signal.

In still another additional embodiment of the invention, the modulated signal is modulated with minimum shift keying.

In yet still another additional embodiment of the invention, the at least one listening parameter is amplitude.

In yet another embodiment of the invention, the at least one listening parameter is frequency.

In still another embodiment of the invention, the offset data represents the frequency of the transmitted offset.

In yet still another embodiment of the invention, the adjustment of the at least one listening parameter adds the offset data frequency to the listening parameter.

In yet another additional embodiment of the invention, the signal detection application further directs the processor to determine the presence of a stored modulated signal in the received signal data, keep the transceiver in an active state until the modulated signal is stored in the received signal data, wait for a specified time period before again determining the presence of a stored modulated signal in the received signal data, and demodulate the stored modulated signal in the received signal data based on the adjusted listening parameters.

Still another embodiment of the invention includes a method for determining and compensating for offsets in transmission signals, including acquiring a transmitted signal based on a set of listening parameters using a vehicle telematics device including a processor and a memory, storing the transmitted signal in the received signal data using the vehicle telematics device, determining the presence of a signal offset by determining monotonicity in the received signal data using the vehicle telematics device, generating offset data based on the determined monotonicity using the vehicle telematics device, directing the transceiver to adjust at least one listening parameter based on the offset data using the vehicle telematics device, demodulating the received signal data based on the adjusted listening parameters using the vehicle telematics device, and issuing a low power command signal using the vehicle telematics device.

In yet another additional embodiment of the invention, the determination of a signal offset is based on a subset of the received signal data.

In still another additional embodiment of the invention, the method further includes examining received signal data for changes in sign in the received signal data values using the vehicle telematics device.

In yet still another additional embodiment of the invention, the transmitted signal is a modulated signal.

In yet another embodiment of the invention, the modulated signal is modulated with minimum shift keying.

In still another embodiment of the invention, the at least one listening parameter is amplitude.

In yet still another embodiment of the invention, the at least one listening parameter is frequency.

In yet another additional embodiment of the invention, wherein the offset data represents the frequency of the transmitted offset.

In still another additional embodiment of the invention, the adjustment of the at least one listening parameter adds the offset data frequency to the listening parameter.

In yet still another additional embodiment of the invention, the method further includes determining the presence of a stored modulated signal in the received signal data using the vehicle telematics device, keeping the transceiver in an active state until the modulated signal is stored in the received signal data using the vehicle telematics device, waiting for a specified time period before again determining the presence of a stored modulated signal in the received signal data using the vehicle telematics device, and demodulating the stored modulated signal in the received signal data based on the adjusted listening parameters using the vehicle telematics device.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods for identifying and compensating for offsets in received transmission signals in accordance with embodiments of the invention are disclosed. Many vehicles have been equipped with a telematics unit. These telematics units can obtain and/or measure a variety of data regarding the conditions and/or location of the vehicle along with receiving and transmitting data to remote server systems. In many designs, telematics units are powered either by an internal battery alone or power supplied from the vehicle. In these designs, using excessive power may artificially shorten the lifespan of the telematics unit and/or drain the vehicle's battery. One power management technique often employed is to program the telematics unit to "wake up" from a sleep state and check for signal messages transmitted from communication towers periodically. For example, a telematics unit can be woken every 8 seconds for 0.2 seconds, although any timing pattern can be utilized as appropriate to the requirements of specific applications of embodiments of the invention. Power management techniques that can be utilized in accordance with embodiments of the invention are described in U.S. Pat. No. 8,229,518, issued Jul. 24, 2012, the disclosure of which is hereby incorporated by reference in its entirety. The transmitting and receiving of data is often done with communication towers placed at various geographic locations to provide communication services over a geographic area. In certain configurations, communication towers transmit signals that are synchronized in a schedule of signal messages, allowing a telematics unit's sleep and wake-up modes to be synchronized to that transmission schedule. However, telematics units can have problems with synchronizing signals received from communication towers when the signal is offset in frequency and/or time from is expected as telematics units routinely employ a reference oscillator tuned to the expected frequency of the signals provided by the communication towers. To compensate for these unexpected conditions, telematics units may have to spend a longer amount of time in a "wake" cycle listening for or processing the received signals in order for the messages to be demodulated. This extra time and processing required by the telematics units requires more energy, which can negatively affect performance and/or lifespan of the telematics unit, particularly when the telematics unit is powered solely by an internal battery. Therefore, it is desirable to employ power management techniques to ensure that the telematics unit does not utilize more power than is necessary.

Vehicle telematics devices in accordance with embodiments of the invention overcome these limitations by compensating for the offsets in communication towers in a manner that minimizes the amount of time needed in the wake cycle. In many embodiments, the vehicle telematics device checks the received signal by sampling the first few segments of the received signal and dynamically calculating an offset between the expected frequency and the frequency of the received signal. Furthermore, the presence of an offset in the received signal can be determined in a similar manner. In a number of embodiments, the memory registers are checked for a change in sign of the signal, which indicates the lack of a successfully received signal present in memory. The lack of a successfully received signal does not necessitate the need for the vehicle telematics device to wake up from a sleep state. Similarly, the presence of a monotonic signal can indicate an offset in the received signal. Once it has been determined that a received signal is offset, the listening frequency and/or the wake up command may be offset to minimize the amount of time needed in the wake cycle. By utilizing these techniques, vehicle telematics devices in accordance with embodiments of the invention can reduce power usage and increase their product life cycle, thereby improving the effectiveness of the vehicle telematics device relative to prior art designs. In particular, vehicle telematics devices in accordance with embodiments of the invention are capable of detecting signals offset from an expected frequency, particularly when that frequency is offset from a reference frequency provided by a reference oscillator.

Stolen Vehicle Recovery Systems and Multi-Frame Messages

Figure 1A:
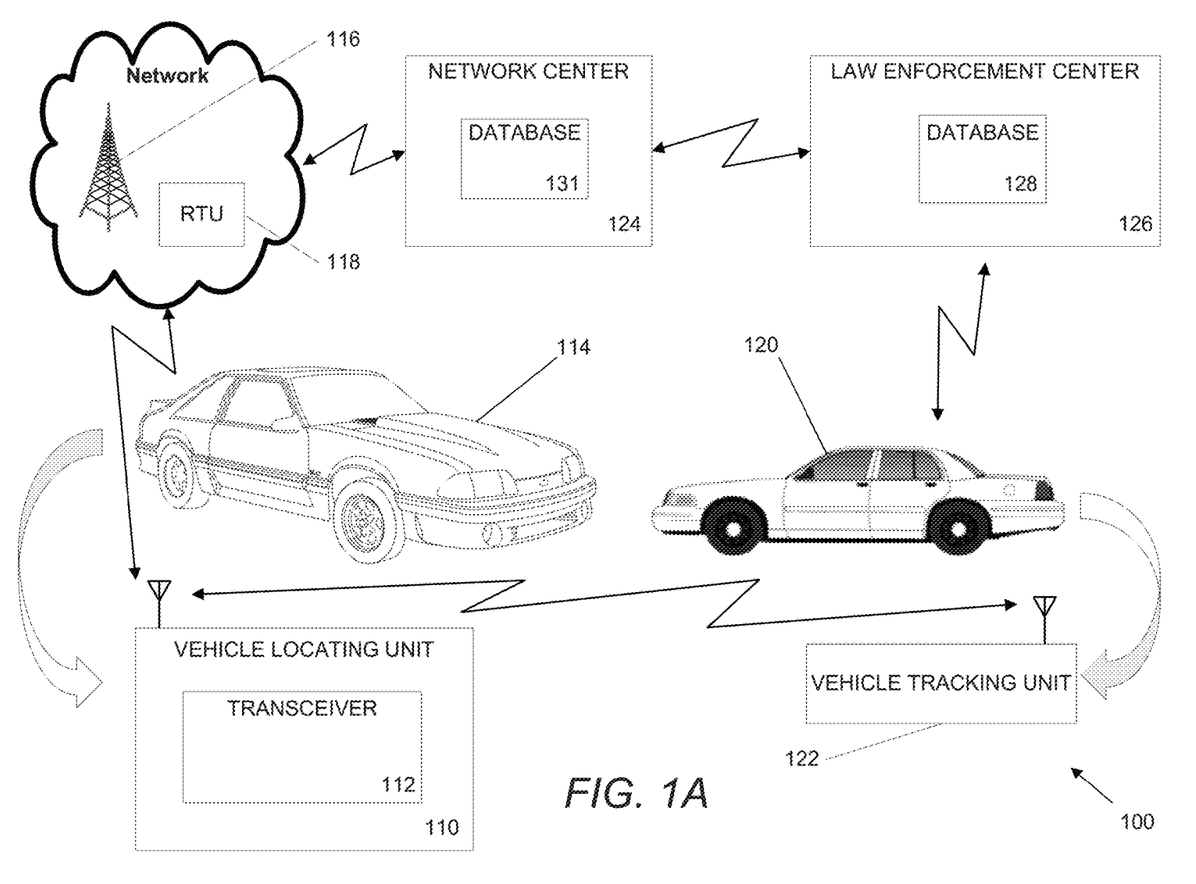
FIG. 1A is a conceptual illustration of the primary components of a stolen vehicle recovery system in accordance with an embodiment of the invention.

Vehicle locating units (i.e. vehicle telematics devices) and communication towers can be utilized in a variety of applications, such as stolen vehicle recovery systems. In many embodiments, these stolen vehicle recovery systems utilize vehicle locating units hidden within vehicles that can receive signal transmissions from the communication towers. Stolen vehicle recovery systems in accordance with embodiments of the invention can transmit a variety of data between a remote server system (i.e. network centers) and a vehicle locating unit. A conceptual diagram of a stolen vehicle recovery system in accordance with an embodiment of the invention is shown in FIG. 1A. The stolen vehicle recovery system 100 includes a vehicle locating unit (VLU) 110 hidden within the vehicle 114 that contains a transceiver 112. The recovery system 100 also includes a network of communication towers 116, each with a remote transmitting unit (RTU) 118, one or more law enforcement vehicles 120, equipped with a vehicle tracking unit 122, and network center 124.

When a user reports that their vehicle has been stolen, the VIN number of the vehicle is reported to law enforcement center 126 for entry into databased 128 of stolen vehicles. The network center 124 includes software that interfaces with the law enforcement database 128 to compare VIN numbers of stolen vehicles against database 131, which includes VIN numbers corresponding to VLU's identification codes. When there is a match between a VIN number of a stolen vehicle and a vehicle locating unit identification code, as would be the case when the stolen vehicle 114 is equipped with a VLU 110, the network center 124 communicates with the RTUs 118 of the various communication towers 116. Each tower transmits a message to active the transponder of the VLU 110 bearing the particular identification code.

Once activated, the transceiver 112 beings transmitting a unique vehicle locating unit identification code. The vehicle tracking unit 122 of law enforcement vehicle 120 proximate to the stolen vehicle 114 receives the vehicle locating unit identification code, and based upon the signal strength and directional information, the appropriate law enforcement vehicle can take active steps to recover the stolen vehicle 114.

The VLU 110 according to embodiments of the invention has a target average current of 15 uA when running at low power. Communication towers 116 transmits, for example, once every 64 seconds so that VLU 110 sleeps for 63 seconds and wakes up when it expects to find the relevant tower transmission. This technique allows the VLU 110 to sleep for 63 to 64 seconds out of every cycle. A transmission from the communications tower 116 includes one or more message frames, as many as eleven message frames for example. When the VLU 110 wakes up and finds the start of a transmission it goes back to sleep until the message frame index, which is particularly assigned to this particular vehicle locating unit arrives. There may be any number of message frames in a transmission. The benefits of this invention increase as the number of message frames increase. Typically, there may be, for example, eleven message frames in the transmission.

Figure 1B:
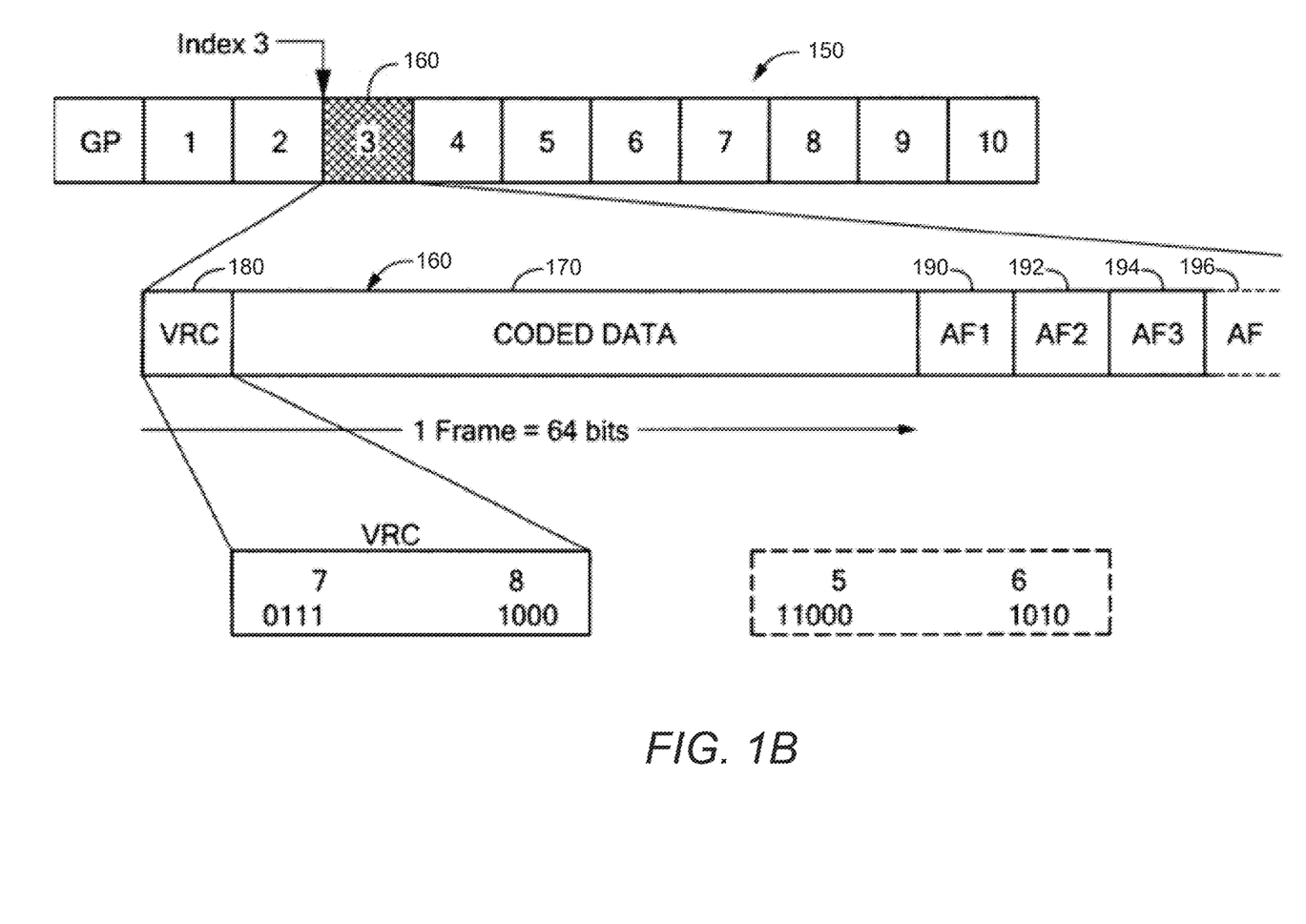
FIG. 1B is a conceptual illustration of a multi-message frame transmission and enlarged diagram showing the detected indexed message frame and auxiliary field in accordance with an embodiment of the invention.

Turning now to FIG. 1B, a multi-message frame transmission in accordance with embodiments of the invention is shown. A transmission 150 includes eleven message frames labelled GP, 1, 2, 3, 4, 5, 6, 7, 8, 9, and 10. The GP message frame is a "Guaranteed Packet" and is typically the first frame of each transmission. Upon the arrival of the GP frame, the vehicle locating unit transitions to the awake mode but then immediately goes into sleep mode until it indexes to its assigned frame. An enlarged view of reference frame three 160 is shown as including coded data section 170 and an auxiliary section 180; this section currently being a vertical redundancy check (VRC) including 64 bits in all. In a number of embodiments, additional auxiliary fields 190, 192, 194, and 196 may be present in the reference frame 160.

Stolen vehicle systems and power management techniques incorporating auxiliary sections and frames that can be utilized in accordance with embodiments of the invention are described in U.S. Pat. No. 9,565,636, issued Feb. 7, 2017. Stolen vehicle recovery systems commonly include one or more vehicle telematics devices installed within a vehicle. These vehicle telematics devices are commonly hidden within the metal structure of the vehicle. Systems and methods for vehicle telematics devices that can be utilized in accordance with embodiments of the invention are described in U.S. Pat. No. 8,013,735, issued Sep. 6, 2011 and U.S. Pat. No. 9,088,398, issued Jul. 21, 2015. The vehicle recovery systems further include a network of communication towers, vehicle tracking units, and a network center with a database of customers who have purchased vehicle telematics devices. When the network center is notified that a vehicle has been stolen, the network center causes the communication towers to transmit a message; this message activates the vehicle telematics device installed in the vehicle. The activated vehicle telematics device broadcasts a signal via an amplified low-power transceiver signal that can be detected by the vehicle tracking units that can then locate the vehicle and effect its recovery. Systems and methods for synchronizing communications in a vehicle telematics system that can be used in accordance with embodiments of the invention are disclosed in U.S. Pat. No. 8,630,605, issued Jan. 14, 2014. In many vehicle recovery systems, the vehicle telematics devices installed in vehicles that have not been stolen can, on receiving a signal that a vehicle has been stolen, repeat the signal broadcasted by the communication towers. This repeating action can be utilized to increase the coverage area of the vehicle telematics system. Systems and methods for vehicle recovery systems that can be utilized in accordance with embodiments of the invention are described in U.S. Pat. No. 8,787,823, issued Jul. 22, 2014. The disclosures of U.S. Pat. Nos. 8,013,735, 8,630,605, 8,787,823, 9,088,398, and 9,565,636 are hereby incorporated by reference in their entirety.

Although specific architectures of stolen vehicle recovery systems and formats for multi-message frame transmissions in accordance with embodiments of the invention are discussed above with respect to FIGS. 1A and B, any of a variety of architectures and formats can be utilized as appropriate to the requirements of specific applications of the invention. Furthermore, the systems and formats described herein can be performed using any combination of the vehicle locating unit, communications towers, and/or the remote server systems as appropriate to the requirements of specific applications of embodiments of the invention. Vehicle telematics devices that may be utilized in stolen vehicle recovery systems are discussed below.

Vehicle Telematics Devices

Figure 2:
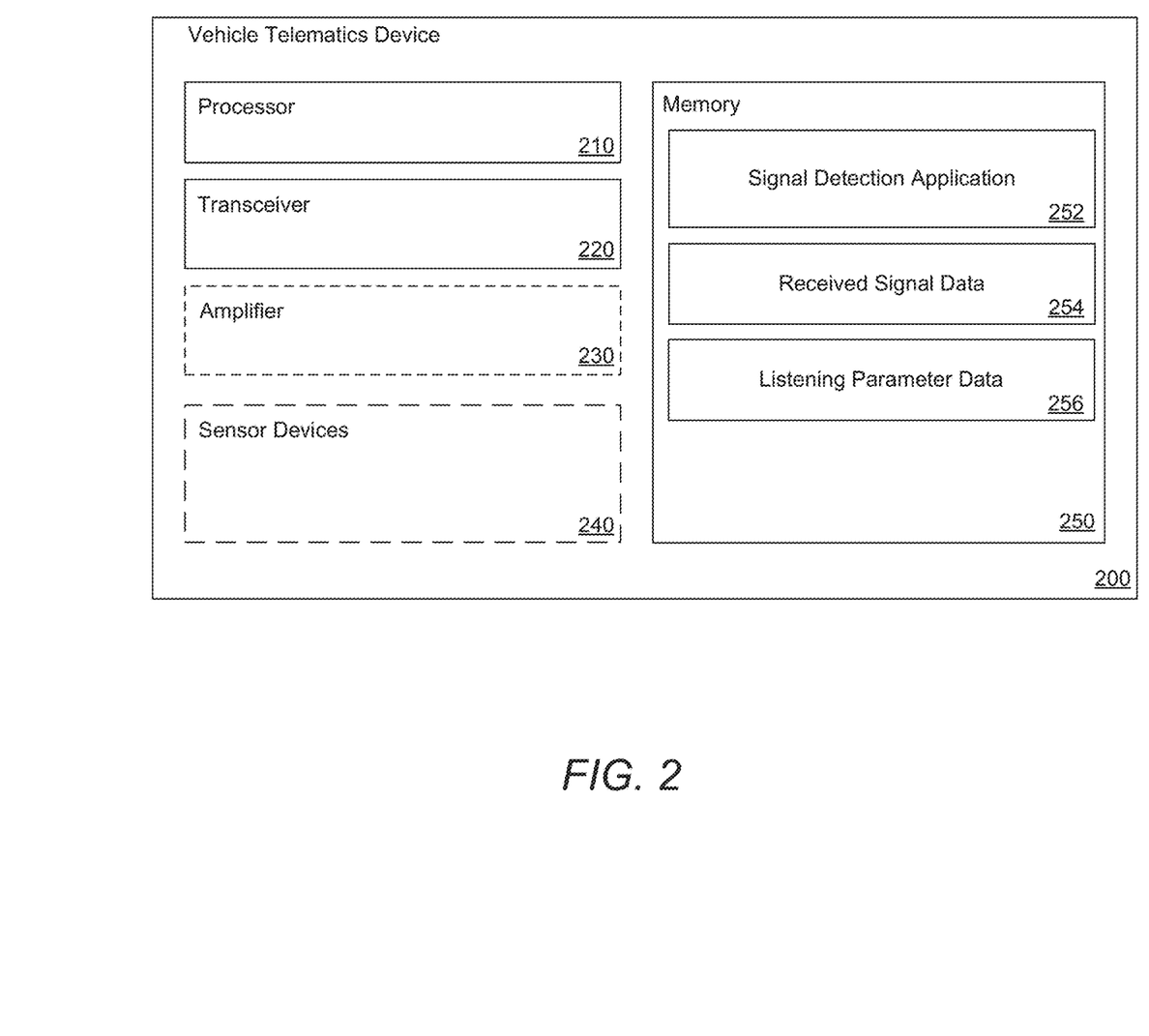
FIG. 2 is a conceptual illustration of a vehicle telematics device in accordance with an embodiment of the invention.

Vehicle telematics devices in accordance with many embodiments of the invention can transmit and receive data using a transceiver. In additional embodiments, vehicle telematics devices locate transmission signals and calculate an offset when the transmission signal is at a frequency differing from an expected frequency. A conceptual illustration of a vehicle telematics device in accordance with an embodiment of the invention is shown in FIG. 2. The vehicle telematics device 200 includes a processor 210 in communication with a memory 250 and one or more transceivers 220 capable of sending and receiving data signals. In many embodiments, transceiver 220 is a CC1125 RF narrowband transceiver from Texas Instruments Incorporated of Dallas, Tex. Furthermore, transceiver 220 and/or processor 210 can be connected to an amplifier 230 that can amplify signals generated by transceiver 220 as appropriate to the requirements of specific applications of embodiments of the invention. Although the processor 210, low-power transceiver 220, and/or amplifier 230 are illustrated as separate components, some or all of these devices can be implemented using a single-chip solution as appropriate to the requirements of specific applications of embodiments of the invention.

The processor 210 is in communication with the transceiver 220, amplifier 230, memory 250, and/or the sensor device(s) 240. The sensor devices 240 can be included within the vehicle telematics device 200 and/or located external to the vehicle telematics device 200. Sensor devices 240 can include, but are not limited to, RPM sensors, voltage sensors, GPS receivers, noise sensors, vibration sensors, acceleration sensors, weight sensors, oscillators, and any other device capable of measuring data regarding a vehicle as appropriate to the requirements of specific applications of embodiments of the invention. In several embodiments, the memory 250 is any form of storage storing a variety of data, including, but not limited to, a signal detection application 252, received signal data 254, and/or listening parameter data 256. In many embodiments, the signal detection application 252, timing data 254, and/or profile data 256 are stored using an external server system and received by the vehicle telematics device 200 using the transceiver 220. In several embodiments, the signal detection application 252 directs the processor 210 to perform a variety of signal detection processes. Signal detection processes in accordance with embodiments of the invention are described in more detail below.

Although specific architectures for vehicle telematics devices in accordance with embodiments of the invention are conceptually illustrated in FIG. 2, any of a variety of architectures, including those that store data or applications on disk or some other form of storage and are loaded into memory at runtime, can also be utilized. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices such as, but not limited to, systems-on-a-chip (SoC). A variety of signal detection processes that can be utilized in accordance with embodiments of the invention are described in more detail below.

Detecting and Compensating for Offsets in Received Signals

Signal detection processes can include keeping a vehicle telematics device in a sleep (i.e. low-power) mode that keeps the power usage level to a minimum when the vehicle telematics device is not actively receiving or transmitting data. In certain embodiments, all non-essential functions and/or components are powered down during the sleep mode to conserve power. In many embodiments, a timer device can be used to time a wake up from the sleep mode, when the needed functions and/or components can be powered up. Signal detection processes in accordance with embodiments of the invention can include waking up the vehicle telematics device and checking the received signal data for an offset, and generating offset data before signal demodulation. An attempt to detect a transmission signal can be made utilizing a set of listening parameters that direct the transceiver to detect a transmission signal. In several embodiments, attempts are made to listen for a digitally modulated signal at a specific frequency. For example, the vehicle telematics device can listen for a minimum shift keyed (MSK) signal at 170 MHz, although any digital modulation type and signal frequency can be utilized as appropriate to the requirements of specific applications of embodiments of the invention.

In a number of embodiments, the transmission signal is transmitted from a series of communication towers. In many instances, a communication tower may transmit a signal at a frequency and/or amplitude that is offset from listening parameters (i.e. listening parameter data describing the listening parameters) expected by the vehicle telematics device. This offset in the signal can be compensated for via adjustments in the listening parameters in order to demodulate the signal. Many transceivers include built-in methods of detecting signals; however these built-in capabilities are commonly unable to detect a signal that is offset from a reference frequency, such as provided by a reference oscillator. Signal detection processes in accordance with embodiments of the invention can first check for received signal data to determine if a signal is present, even when the signal is offset from the anticipated frequency. The data values are read for sign changes and/or monotonicity. When the received signal data contains sign changes, a signal is sent to the transceiver to power down. When the received signal data indicates the presence of monotonicity, offset data can be generated. In several embodiments, offset data can be utilized to adjust the listening parameters from the reference frequency to the reference frequency plus the offset amount present in the offset data. When the signal offset is compensated, demodulation of the signal can occur. When the signal has been completely demodulated, a signal is sent to the transceiver to power down.

Figure 3:
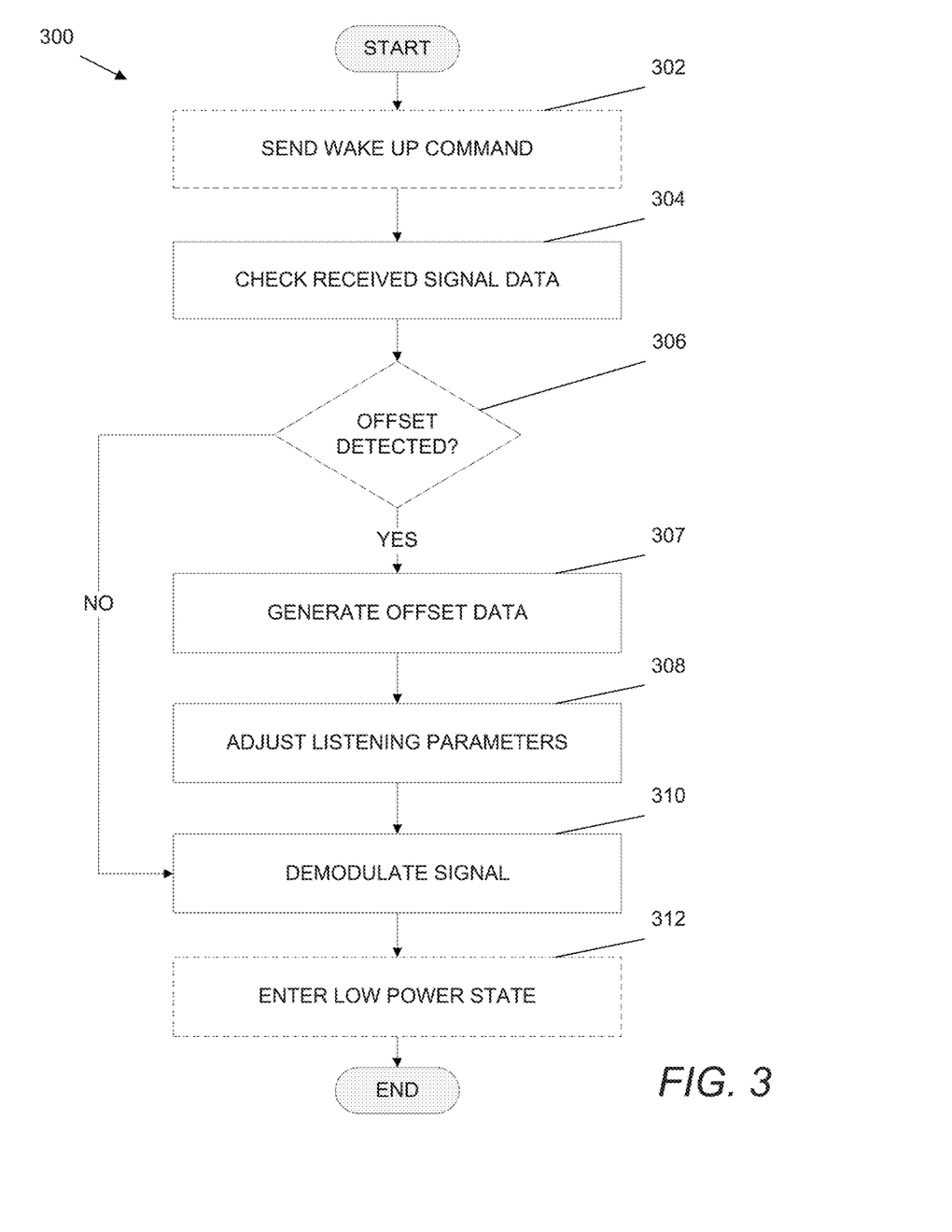
FIG. 3 is a flow chart illustrating a process for detecting and compensating for a signal offset in accordance with an embodiment of the invention.

Turning now to FIG. 3, a process for detecting and compensating for signal offsets in accordance with an embodiment is shown. The process 300 includes sending (302) a wake-up command to certain components in the vehicle telematics device. Received signal data can be checked (304) for sign changes and monotonicity. When no offset is detected (306) in the signal, demodulation (310) of the signal occurs. When an offset is detected (306) in the signal, offset data can be generated (307) and adjustment (308) of the listening parameters can be made prior to demodulation (310) of the signal. When demodulation (310) of the received signal is finished, a lower power state can be entered (312).

Specific processes for detecting and compensating for offsets in received signals in accordance with embodiments of the invention are described above and shown with respect to FIG. 3. However, any number of processes, particularly those that utilize modulation techniques other than MSK, such as GMSK, CDMA, and QAM, can be utilized as appropriate to the requirements of specific applications in accordance with embodiments of the invention. Processes for detecting the presence of a signal offset are discussed below.

Detecting the Presence of a Signal and Offset

Power can be conserved by restricting wake up command signals from being sent until it is necessary to do so. For example, if components of a vehicle telematics device are required to demodulate a signal, it is not necessary for these components to be activated until there is a signal received for demodulation. Verification that a signal is ready for demodulation can include, but is not limited to, detecting sign changes in the received signal data, evaluating the received signal data for monotonic values, and detecting the presence of a modulated signal. This verification can be carried out on a subset of the received signal data instead of the entire signal. In many embodiments, the received signal data is representative of the received signal waveform. Signal detection processes in accordance with embodiments of the invention can include examining received signal data to determine the presence of a signal and offset prior to demodulation.

Sign changes in received signal data can be indicative of an unusable, noisy, or absent signal. In these cases, there would be no signal to demodulate, and power can be conserved if no wake up command is given. The received signal may be transmitted on a repeated synchronized schedule where the messages being transmitted in the signal follow a fixed format for a particular time period, such as 8, 11, or 13 seconds. In certain embodiments, when it has been determined that no useable signal is stored in memory, waiting until the next signal cycle can occur to acquire a useable signal. In several embodiments, if no useable signal is found in memory, no further action is taken as the a useable signal transmission may not be in range or may be experiencing other interference that will not be finished before the next calculated signal cycle occurs.

When no sign changes are detected in the received signal data, the presence of an offset may be detected by examining a subset (or all) of the received signal samples for monotonicity. Monotonicity can be understood as values that continuously increase in value without decreasing or continuously decrease in value without increasing. For example, if the values stored in 7 samples placed roughly 375 microseconds apart are monotonic, then a signal offset is likely present although any offset determination pattern can be utilized as appropriate to the requirements of specific applications of embodiments of the invention. When the received signal data contains monotonic data, offset data is generated to represent the offset values based on the differences in the received signal data and the anticipated signal characteristics. In certain embodiments, the offset data is generated based on the received signal data overcoming a threshold value. Threshold values can be predetermined or dynamically generated as appropriate to the requirements of specific applications of embodiments of the invention. In a number of embodiments, the frequency of the signal and/or the power level of the signal are evaluated against a threshold value. With the offset data, demodulation can be done more efficiently than prior art techniques as the offset data can be utilized to adjust the listening parameters that direct the transceiver. In many embodiments, when a signal offset is defined, attempts are made to determine if a modulated signal is present in the received signal data before wake up commands are given and demodulation of the signal begins. In a number of embodiments, when there is no modulated signal present in the received signal data, the next signal cycle is resampled and examined for an offset and usable signal again.

Figure 4:
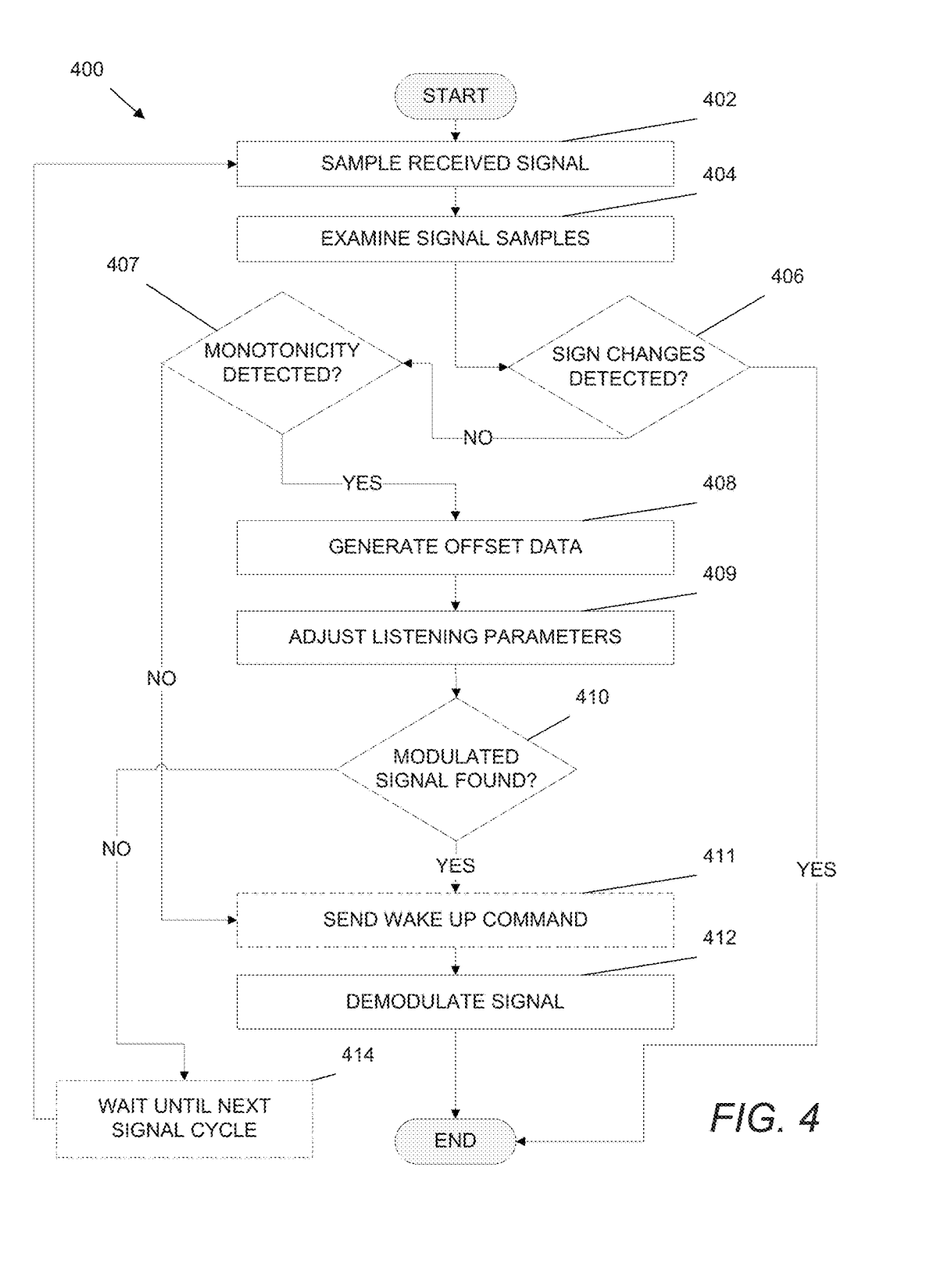
FIG. 4 is a flow chart illustrating a process for detecting the presence of a signal and signal offset in accordance with an embodiment of the invention.

Turning now to FIG. 4, a process for detecting the presence of a signal and its potential offset in accordance with an embodiment is shown. The process 400 includes sampling (402) a received signal. The samples of the signal are examined (404) for sign changes and monotonicity. When sign changes are detected (406) in the signal samples, the process is completed. When sign changes are not detected (406), monotonicity in the signal can be detected (407). When no monotonicity is detected in the signal samples, a wake up command can be sent (411) and demodulation (412) of the signal can occur. When monotonicity is detected (407), offset data is generated (408). The process 400 adjusts (409) the listening parameters and evaluates if a modulated signal is found (410). In many embodiments, when no modulated signal is found (410), the process 400 waits (414) until the next signal cycle to restart the process 400. When a modulated signal is found (410), a wake up command can be sent (411) and demodulation (412) of the signal occurs.

Specific processes for examining received signal data to determine the presence of a signal and signal offset prior to demodulation in accordance with embodiments of the invention are described above and shown with respect to FIG. 4. However, any number of processes, particularly those that determine the offset of a signal based on historical received signal data rather than expected signal characteristics, can be utilized as appropriate to the requirements of specific applications in accordance with embodiments of the invention. Processes for demodulating signals with signal offsets are discussed below.

Processes for Demodulating Signals with a Signal Offset

In many embodiments, when the detection of a signal offset occurs, signal offset data is generated. In certain embodiments, signal offset data may be utilized to modify listening parameters described in listening parameter data. In a number of embodiments, the listening parameters can be utilized to direct a transceiver to receive signals at a frequency of the sum of an initial listening frequency and the amount of detected signal offset in the offset data. When it is determined that a modulated signal is present, demodulation of the signal can be performed. In several embodiments, the transceiver is kept in an active state and the search for a modulated signal continues for a certain period of time based on a cycling period for the desired signal to be received. For example, the signal may be cycling in a manner that repeats the signal every 8, 11, or 13 seconds, although any signal cycling timings can be utilized as appropriate to the requirements of specific applications of embodiments of the invention. In numerous embodiments, multiple signal cycles are analyzed before a modulated signal is found. Signal detection processes in accordance with embodiments of the invention can include detecting offsets in received signals and compensating for those offsets until demodulation of the received signals can be completed.

Figure 5:
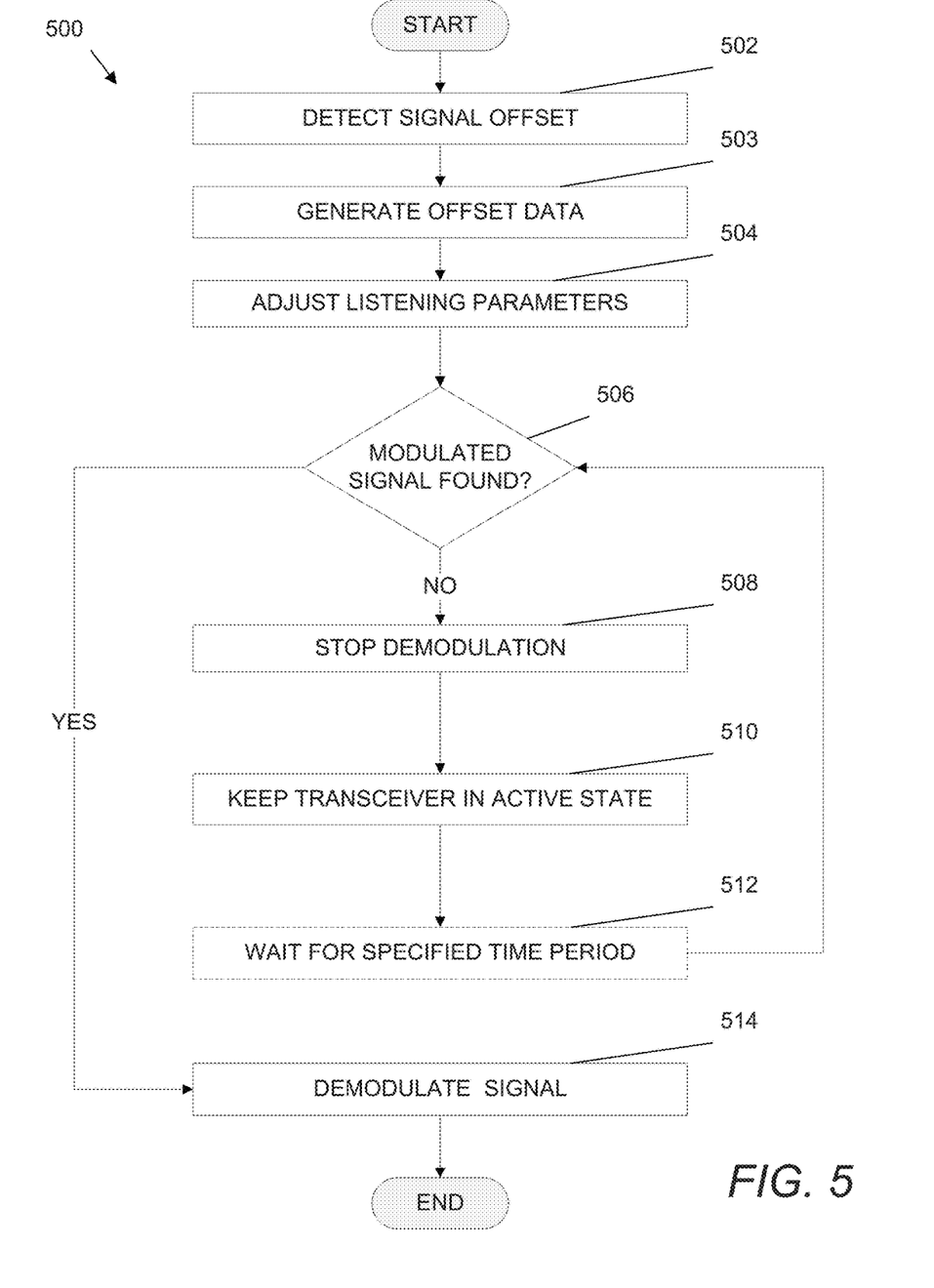
FIG. 5 is a flow chart illustrating a process for demodulating signals with a signal offset in accordance with an embodiment of the invention.

Turning now to FIG. 5, a process for demodulating a received signal in the presence of a signal offset in accordance with an embodiment of the invention is shown. The process 500 includes detecting (502) a signal offset. Offset data is generated (503) based on the signal offset detected (502). Listening parameters can be adjusted (504) based on the offset data generated (503). When a modulated signal is found (506), the signal can be demodulated (514). When modulated signals are not found (506), demodulation is stopped (508). The transceiver is kept (510) in an active state. In several embodiments, the process 500 waits (512) for a specified period of time before attempting to find (506) a modulated signal.

Specific processes for demodulating a signal in the presence of a signal offset in accordance with embodiments of the invention are described above and shown with respect to FIG. 5. However, any number of processes, particularly those that do not use a fixed signal cycling time period, can be utilized as appropriate to the requirements of specific applications in accordance with embodiments of the invention. Processes for conducting an extended cold search state are discussed below.

Processes for Determining when to Execute an Extended Cold Search State

The data in the modulated signals is demodulated in order to extract the encoded data within the signal. Modulated signals can vary between high and low quality signals. Typically, a high quality modulated signal will result in less time being spent to demodulate the signal. Lower quality modulated signals may require a longer time to properly demodulate the signal, necessitating a longer wake cycle for the unit. The modulated signals can be susceptible to low signal quality, particularly those embodiments utilizing MSK. Signal detection processes in accordance with embodiments of the invention can determine when to enter into an extended cold search state by examining the presence and quality of a modulated signal.

In certain circumstances, an extended cold search is performed to facilitate signal modulation. When monotonicity is detected in the received signal data, and no modulated signal is found, the demodulation process can be stopped. In certain embodiments, the receiver remains powered up and demodulation resumes after a fixed period of time. In several embodiments, the modulated signal will be transmitted in a fixed repeating pattern. For example, the fixed period of time for an extended cold search can be 14 milliseconds, although any demodulation delay values can be utilized as appropriate to the requirements of specific applications of embodiments of the invention. When in the extended cold search state, further attempts are made to find and demodulate transmitted signals. In a number of embodiments, detection of an offset, generation of offset data, and/or adjustment of listening parameters occurs during the extended cold search.

The extended cold search can require more components to remain powered on for longer period of time, thereby increasing power requirements and potentially decreasing the usable life of a vehicle telematics device. Therefore, in several embodiments, extended cold searches are only performed in certain sleep/wake cycles based on the offset and modulated signal found, as well as the quality of the modulated signal. Generally, when the modulated signal has a high quality, no extended cold search is needed. When the modulated signal is of a lower quality, a cold search state is required.

Figure 6:
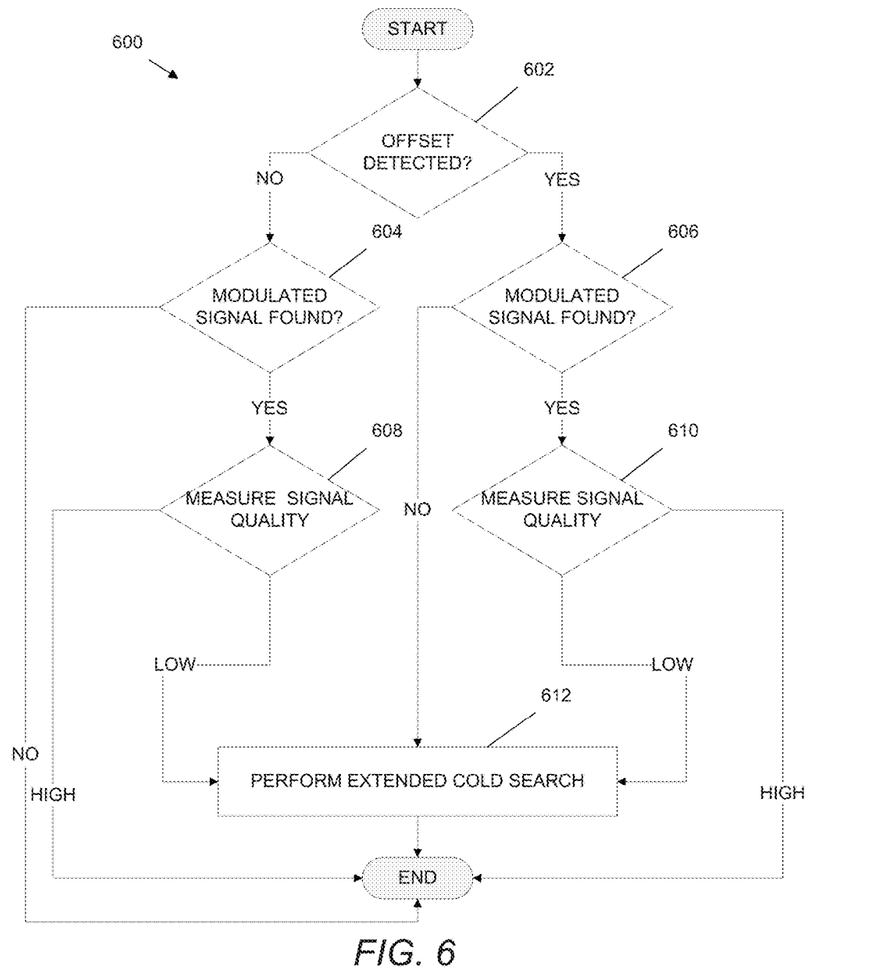
FIG. 6 is a flow chart illustrating a process for determining when to enter into an extended cold search state in accordance with an embodiment of the invention.

Turning now to FIG. 6, a process for determining when to enter into an extended cold search state in accordance with an embodiment of the invention is shown. The process 600 includes detecting (602) a signal offset. When no offset in the signal is detected (602), it is determined if a modulated signal is found (604). When no modulated signals are found (604), the process 600 ends without performing an extended cold search. When a modulated signal is found (604) without an offset detected (602), the quality of the modulated signal is measured (608) to determine if the signal quality is either high or low. When the modulated signal quality is measured (608) as high, the process 600 ends without an extended cold search state being entered into. If the measured (608) modulated signal is of low quality, an extended cold search is performed (612). When an offset is detected (602) in the received signal data, the received signal data is utilized to find (606) a modulated signal. When no modulated signal is found (606), an extended cold search is performed (612). If a modulated signal is found (606) the modulated signal quality is measured (610). When the measured (610) quality is high, the process 600 ends. When the modulated signal quality is measured (610) as low, then the process 600 performs (612) an extended cold search.

Specific processes for determining when to enter into an extended cold search state in accordance with embodiments of the invention are described above and shown with respect to FIG. 6. However, any number of processes, particularly those that utilize multiple quality levels in addition to high and low, can be utilized as appropriate to the requirements of specific applications in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device, comprising:
   a processor;
   a transceiver connected to the processor; and
   a memory connected to the processor and storing a signal detection application;
   wherein the signal detection application directs the processor to:
      command the transceiver to acquire a transmitted signal based on a set of listening parameters;
      store the transmitted signal as received signal data;
      determine a presence of a signal offset by determining monotonicity in the received signal data;
      generate offset data based on the determined monotonicity;
      command the transceiver to adjust at least one listening parameter based on the offset data;
      demodulate the received signal data based on the adjusted listening parameters; and
      issue a low power command signal.

2. The vehicle telematics device of claim 1, wherein the determination of a signal offset is based on a subset of the received signal data.

3. The vehicle telematics device of claim 1, wherein the signal detection application further directs the processor to examine received signal data for changes in sign in the received signal data values.

4. The vehicle telematics device of claim 1, wherein the transmitted signal is a modulated signal.

5. The vehicle telematics device of claim 4, wherein the modulated signal is modulated with minimum shift keying.

6. The vehicle telematics device of claim 1, wherein the at least one listening parameter is amplitude.

7. The vehicle telematics device of claim 1, wherein the at least one listening parameter is frequency.

8. The vehicle telematics device of claim 1, wherein the offset data represents the frequency of the transmitted offset.

9. The vehicle telematics device of claim 8, wherein the adjustment of the at least one listening parameter adds the offset data frequency to the listening parameter.

10. The vehicle telematics device of claim 1, wherein the signal detection application further directs the processor to:
Determine a presence of a stored modulated signal in the received signal data;
keep the transceiver in an active state until the modulated signal is stored in the received signal data;
wait for a specified time period before again determining the presence of a stored modulated signal in the received signal data; and
demodulate the stored modulated signal in the received signal data based on the adjusted listening parameters.

11. A method for determining and compensating for offsets in transmission signals, comprising:
acquiring a transmitted signal based on a set of listening parameters using a vehicle telematics device comprising a processor and a memory;
storing the transmitted signal in the received signal data using the vehicle telematics device;
determining a presence of a signal offset by determining monotonicity in the received signal data using the vehicle telematics device;
generating offset data based on the determined monotonicity using the vehicle telematics device;
directing the transceiver to adjust at least one listening parameter based on the offset data using the vehicle telematics device;
demodulating the received signal data based on the adjusted listening parameters using the vehicle telematics device; and
issuing a low power command signal using the vehicle telematics device.

12. The method of claim 11, wherein the determination of a signal offset is based on a subset of the received signal data.

13. The method of claim 11, further comprising examining received signal data for changes in sign in the received signal data values using the vehicle telematics device.

14. The method of claim 11, wherein the transmitted signal is a modulated signal.

15. The method of claim 11, wherein the modulated signal is modulated with minimum shift keying.

16. The method of claim 15, wherein the at least one listening parameter is amplitude.

17. The method of claim 11, wherein the at least one listening parameter is frequency.

18. The method of claim 11, wherein the offset data represents the frequency of the transmitted offset.

19. The method of claim 18, wherein the adjustment of the at least one listening parameter adds the offset data frequency to the listening parameter.

20. The method of claim 11, wherein the method further includes:
Determining a presence of a stored modulated signal in the received signal data using the vehicle telematics device;
keeping the transceiver in an active state until the modulated signal is stored in the received signal data using the vehicle telematics device;
waiting for a specified time period before again determining the presence of a stored modulated signal in the received signal data using the vehicle telematics device; and
demodulating the stored modulated signal in the received signal data based on the adjusted listening parameters using the vehicle telematics device.

* * * * *